Oct. 28, 1958 L. R. KAHN 2,858,369
MEANS FOR MODULATING A SINGLE CARRIER WITH DISSIMILAR SIGNALS FOR TELEVISION TRANSMISSION AND THE LIKE
Filed Aug. 5, 1954
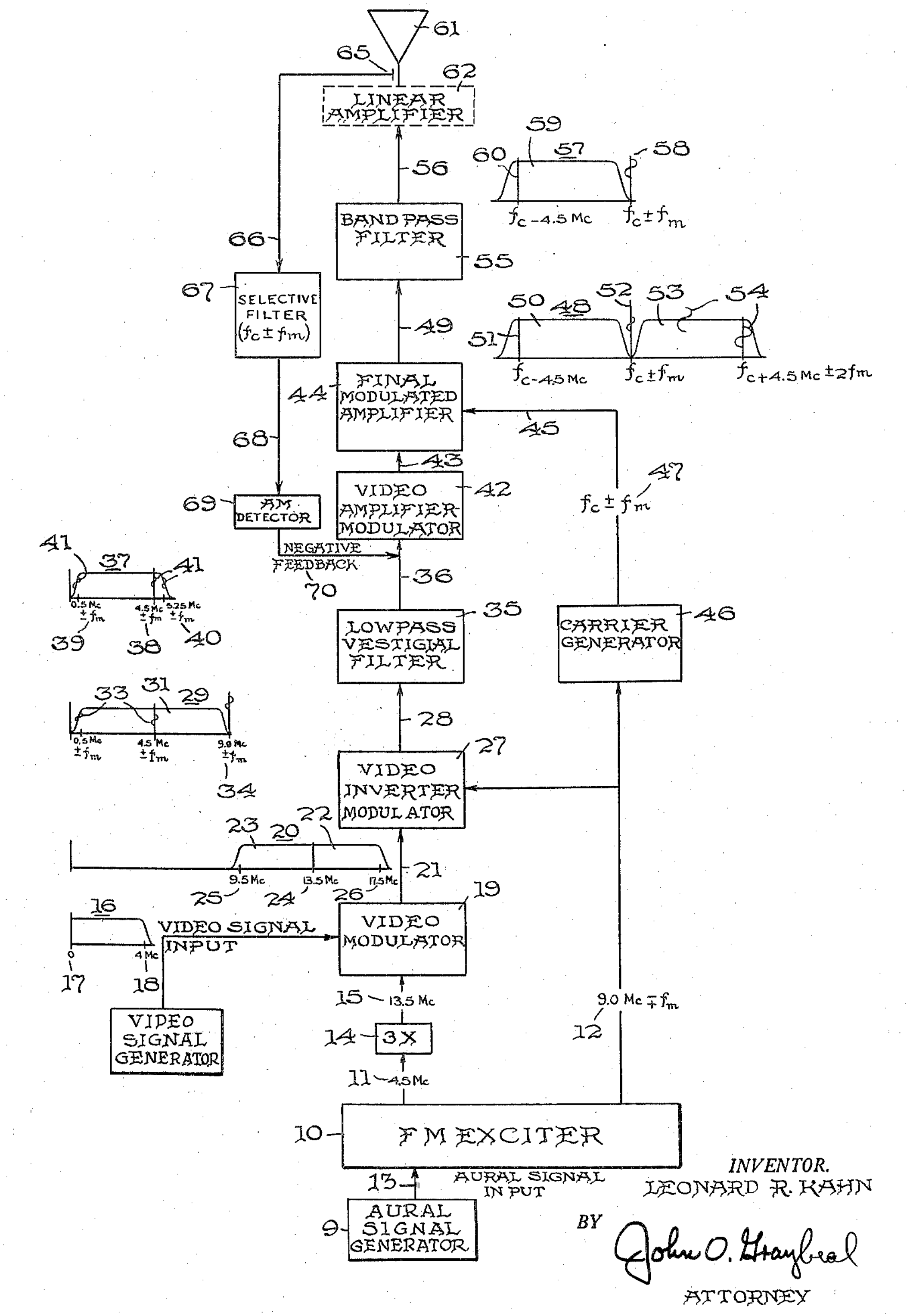
INVENTOR.
LEONARD R. KAHN
BY John O. Graybeal
ATTORNEY 2,858,369

MEANS FOR MODULATING A SINGLE CARRIER WITH DISSIMILAR SIGNALS FOR TELEVSION TRANSMISSION AND THE LIKE

Leonard R. Kahn, Freeport, N. Y.

Application August 5, 1954, Serial No. 448,006

20 Claims. (Cl. 178—5.8)

The present invention relates to radiant energy transmission and more particularly relates to modulation procedures for multiplexing dissimilar signals on a single carrier wave. In a specific application to the field of television broadcasting, the present invention relates to the generation of a single R. F. carrier, frequency modulated by an aural signal and amplitude modulated by a video signal.

Heretofore, various television systems have been designed to provide multiplex modulation of a single carrier by video and aural signals. However, all such existing systems either require some form of time multiplexing or are otherwise incapable of operation consistent with existing FCC requirements. To conform to such requirements, present commercially employed transmission systems have adopted separate video and aural carrier wave generators, each carrier being related in frequency through one or more crystal controlled oscillators and various frequency multiplier circuits to provide the necessary frequency relation and frequency stability of the respective carriers.

In such existing television transmission systems, the video carrier transmitter may be categorized as employing low-level, medium-level, or high-level modulation, depending upon the power level at which the carrier wave is amplitude modulated by the video signal. In a conventional low-level video modulation system (R. F. power input to the modulated amplifier on the order of 1 watt), a plate-modulated modulator stage for modulating the carrier wave with the video signal may be employed. Several stages of linear amplifiers are necessary to raise the power to the required level and to vestigally suppress the lower video sideband by off-carrier tuning. Practice has demonstrated that in a low-level video modulation system the relatively large number of off-carrier tuned linear amplifiers in the output are comparatively difficult to establish and maintain in proper tuned relation to provide linearity in the video signal spectrum at carrier frequency while retaining the required vestigal filtering characteristics.

The conventional medium-level modulation video transmitter (with an R. F. power input to the modulator on the order of 60 watts) may employ either grid or plate modulation circuitry with acceptable modulation linearity. Fewer linear amplifier stages are needed than in a low-level modulation system, with such linear amplifier stages also serving to vestigially suppress the lower video sideband. In general, in a meduim-level modulation system, modulation problems are more complicated than found with low-level modulation, but tuning problems are generally reduced in view of the fewer number of linear amplifiers employed.

In a conventional high-level modulation video transmission system (R. F. input to the modulated amplifier on the order of 400 watts), a high-power, grid modulated final stage is required, followed by a high-level vestigial sideband filter of complex design. In addition, those systems employing high-level video modulation require a notch filter system at the output stage to provide adequate attenuation of the video signal in the frequency area coincident with the frequency modulated aural carrier.

Existing television transmission systems capable of radiating a composite television signal conforming to existing standards require use of separate carrier generators for the video and aural carriers and a complex diplexing system to deliver each of the R. F. carriers to a common radiation means, irrespective of whether low-level, medium-level or high-level final modulation of the video carrier is employed. With use of separate carrier generators, close control is required to maintain the separation between the respective carriers within established tolerances, since the separate chains of frequency multiplying stages necessary to develop each carrier frequency inherently multiply any frequency errors introduced through frequency shift of either of the oscillators.

Moreover, all present video modulation systems require complex D. C. restoration circuitry and associated power supplies to restore the D. C. component of the video signal at the video signal input to the final modulated amplifier, since no practical manner of D. C. coupling the video amplifier stages consistent with required linearity has evolved.

It is an object of the present invention to provide a transmitting system having modulation circuitry capable of modulating a composite television signal on a single transmitter carrier.

It is a further object of the present invention to provide a new method of and system for transmitting television signals by use of a single carrier transmitter, wherein the aural signal frequencies frequency modulate the carrier wave and the video signal frequencies amplitude modulate said carrier wave center frequency in a manner to provide a simulated or apparent video carrier and thereby produce a composite television signal modulated carrier wave conforming to existing transmission standards.

It is an additional object of the present invention to provide in a television transmitter a final modulated stage not requiring external D. C. restoration of the video signal input and allowing use of transformer coupling in the video amplifiers and final modulator input through a very substantial reduction in the ratio between the highest video signal frequency and the lowest video signal frequency delivered to the final modulation stage. A related object of the modulation procedures of the present invention is to enable push-pull operation of the final modulator stage, in turn allowing Class B operation of such modulation stage with consequent increased efficiency. An additional related object of the present invention is to provide video circuitry which through inversion of the video signal input to the final modulation stage and through transformer input coupling to such stage effectively attenuates the video signal in the area thereof subsequently coincident with the frequency modulated aural carrier frequencies, thus eliminating the necessity for use of notch filtering systems for this purpose.

Another object of the present invention is the elimination of conventional diplexing output circuitry and substantial reduction in transmission system cost and complexity by elimination of separate power amplifiers for the video and aural carriers. It is a further object of the present invention to provide video signal development circuitry capable of utilizing a simplified, lowpass vestigial filter at relatively low frequency and low power level.

Another object of the present invention is to provide a video signal modulation system capable of improved contrast ratios through utilization of video signal modulation at relatively low frequency and low power levels.

It is a further object of the present invention to present a television transmission system capable of degeneration of incidental amplitude modulated noise superimposed on the radiated signal in the final modulator stage and linear amplifier stages, by the detection of any amplitude modulated noise on the radiated aural carrier and by the feeding of such noise in opposite phase to a video amplifier preceding the carrier modulated stage.

It is a further object of the present invention to provide a television transmission system utilizing video signal subcarrier development stages and a final modulator stage whereby the required separation between the radiated aural carrier center frequency and the radiated video signal subcarrier is readily maintained within required tolerances by heterodyning techniques.

These and other objects will be apparent from a consideration of the following description of the invention.

In its broad aspects, the modulation procedures and radiant energy transmission system of the present invention relates to the generation of a single R. F. carrier and the modulation thereof by dissimilar signals. As applied to television signal carrier transmission, the present invention essentially involves inverting an amplitude modulated video signal, frequency modulating the inverted video signal with the aural signal and frequency modulating the aural frequency modulated carrier with said frequency modulated inverted video signal in a manner to cancel the frequency modulation from said video signal as such signal appears in the difference sideband of the modulator output.

More specifically, the present invention provides for the development of television signal carrier transmission having an amplitude modulated video signal and a frequency modulated aural signal, wherein the transmission system includes means for generating a video signal, video modulator means for mixing said video signal with a first reference frequency to allow selection of a video signal having double sidebands about said first reference frequency, means for generating a second reference frequency differing in frequency from said first reference frequency by the desired frequency difference between the required output video carrier frequency and aural carrier center frequency, means for frequency modulating said second reference frequency with said aural signal, means for heterodyning the aforesaid first reference frequency and associated video signal sidebands with said aural signal frequency modulated second reference frequency, the difference frequencies in the output from such heterodyning stage providing an inverted, double sideband amplitude modulated video signal about a video subcarrier of frequency corresponding to the aforesaid required frequency difference between the output video carrier frequency and the aural carrier center frequency, the components of such signal being also frequency modulated by the aural signal, means for vestigially suppressing such heterodyning stage output signal frequencies above said subcarrier frequency, means for generating an aural carrier frequency modulated by said aural signal, means for modulating said frequency modulated aural carrier with the aforesaid video subcarrier and said video subcarrier sideband frequencies in a manner so that the difference frequencies appearing in the output of the last-mentioned modulation means have the aural signal frequency modulation substantially removed or cancelled therefrom, means for selecting from such output the aural carrier and the difference frequencies, as by a suitable bandpass filter, and means for radiating said aural carrier and said difference frequencies.

From the modulation procedure presented, it will be apparent that such difference frequencies at the latter carrier modulation stage output comprises the required amplitude modulated video signal, with the video signal subcarrier lying below and separated from the aural carrier center frequency by the required frequency difference.

Considering the television transmission system of the present invention in greater detail, reference is made to the accompanying drawing, illustrating in block form a typical embodiment of the present invention. In the system presented, a conventional aural signal generator 9 and an FM exciter 10 function to produce an unmodulated 4.5 mc. wave 11 and, by reactance modulator means known to the art, a 9.0 mc. wave 12, frequency modulated, as indicated by the terminology $\mp f_m$, by aural signal input 13, the relation between the 4.5 mc. wave 11 and the 9.0 mc. $\mp f_m$ wave 12 center frequency being such that an accurate frequency difference of 4.5 mc. therebetween is maintained. The 4.5 mc. wave 11 may be generated by use of a crystal controlled oscillator and, through a tripler stage 14, generates at 13.5 mc. wave 15, which may also be termed a first reference frequency. It will become apparent from the following description of the invention, however, that first reference frequency 15 and 9.0 mc. $\mp f_m$ wave 12 may be otherwise generated, as by use of a separate oscillator circuit and a reactance modulator, respectively, and may vary in order of frequency so long as the aforementioned frequency difference therebetween is maintained.

Input video signal 16 may be generated in a known manner by conventional video signal generator 8 and will be understood to contain substantially unattenuated amplitude modulated components ranging from 0 frequency to about 4 mc., as respectively indicated at 17 and 18, and will be further understood to be either monochromatic or polychromatic in nature and include appropriate synchronizing components according to existing standards. Such video signal 16 is fed to video modulator 19, and there mixed with 13.5 mc. first reference frequency 15, resulting in an output wave form 20 at output 21 of video modulator 19, the selected output video signal 20 appearing as upper and lower sidebands 22 and 23 about said first reference frequency, indicated at 24, such video signal 20 ranging in unattenuated frequency spectrum from about 9.5 mc. to about 17.5 mc., as respectively indicated at 25 and 26.

Said video signal 20 is then delivered to the video inverter-modulator 27, as shown, and there heterodyned with the 9.0 mc. $\mp f_m$ wave 12, which may also be referred to as a second reference frequency. Output 28 from video inverter-modulator 27 provides a video signal 29 having an amplitude modulated lower sideband 31, having superimposed on the components thereof frequency modulated ($\pm f_m$) components, as respectively schematically indicated at 33, it being apparent that such video sideband 31 appear with respect to a center frequency 34 derived from and corresponding to the 9.0 mc. $\mp f_m$ wave second reference frequency 12, output 28 being advantageously of appropriate design to suppress the summation sideband in the area of 22.5 mc. Resulting video signal 29 is thereupon delivered to a lowpass vestigial filter 35 of appropriate design to suppress all components of said video signal 29 above approximately 5.25 mc. $\pm f_m$ to produce at output 36 of said lowpass vestigial filter 35 a video signal, as generally indicated at 37, which will be understood from the modulation procedures presented to be inverted in nature, and to comprise a 4.5 mc. $\pm f_m$ component which is indicated at and may otherwise be termed the video signal subcarrier, which is comparable to the 0 frequency component 17 of the original video signal 16. Said inverted video signal 37 further comprises unattenuated frequencies, ranging from 0.5 mc. $\pm f_m$, as indicated at 39, generally comparable to the unattenuated 4 mc. frequency 18 of original video signal 16, the approximate highest unattenuated frequency being 5.25 mc. $\pm f_m$, as indicated at 40. It will also be understood from the nature of the vestigial suppression accomplished by lowpass vestigial filter 35 that the passed frequencies at output 36 thereof essentially retain the $\pm f_m$ frequency modulation of the components thereof, as indicated at 41.

Inverted video signal 37 is thereupon fed through a video amplifier-modulator stage 42, as desired, to the video input 43 of a final modulated amplifier 44. The R. F. input 45 to final modulated amplifier 44 in the system here presented is derived from the frequency modulated, 9.0 $\mp f_m$ second reference frequency wave 12 through a suitable carrier generator 46, which will be understood to include one or more stages of appropriate mixing and filtering circuitry known to the art to develop the desired carrier frequency $f_c$ with the aural signal frequencies modulated thereon ($\pm f_m$), such frequency modulated carrier frequency being designated $f_c \pm f_m$, as indicated at 47. In practice it has been found advantageous to utilize plural mixing stages to generate this carrier wave, particularly for R. F. frequencies in the U. H. F. band.

It is a feature of the present invention that the video input 43 to final modulated amplifier 44 may advantageously utilize transformer or inductive coupling, not shown, of suitable design to automatically provide attenuation of frequencies on the order of less than 25 kc. appearing in inverted video signal 37, which coupling procedure eliminates any necessity for notch filtering in the subsequent output stages. It will also be apparent that the nature of video signals 20, 29 and 37 respectively allow utilization of transformer or inductance coupling in the coupling circuits between video modulator 19, video inverter-modulator 27, lowpass vestigial filter 35, and video amplifier 42.

It is to be noted as one important feature of the present invention that, by the video signal inversion and modulation procedures here presented, the ratio of the highest unattenuated inverted video frequency (5.25 mc.) to the lowest unattenuated inverted video frequency (0.5 mc.) is 10.5 at the input to the final modulator stage whereas in the conventional television transmitter this ratio is about 4 mc. divided by 20 cycles, or approximately 200,000. This great reduction in frequency ratio renders practical the use of transformer coupling with excellent isolation between video amplifier stages and the use of increased voltage ratios with consequent increased efficiency. It is to be further noted that another important feature of the present invention is that, by virtue of the video signal inversion the 0 frequency or D. C. component of the original video signal is represented by the 4.5 mc. $\pm f_m$ component 38 of video signal 37, and is readily passed to the final modulator stage through the aforesaid transformer coupling to provide the desired D. C. video signal level without the necessity of separate D. C. restoration circuitry.

With the frequency modulation 41 appearing on the components of inverted video signal 37 and the frequency modulation appearing on the aural carrier wave 47 in phase, the resulting output wave form 48 appearing at output 49 of final modulated amplifier 44 comprises a lower or difference sideband 50 having the frequency modulation removed or cancelled from the video components and further having what may be designated as a video high frequency subcarrier 51 which may also be termed an apparent or simulated video carrier, appearing at a frequency of $f_c$—4.5 mc. Said final modulated amplifier output wave form 48 further comprises the aural frequency modulated carrier 52 of frequency $f_c \pm f_m$ and an upper or summation sideband 53, the components of which are twice frequency modulated, as indicated at 54, including an upper video high frequency subcarrier of frequency $f_c$+4.5 mc.$\pm 2f_m$. Such double frequency modulation 54 of the summation video sideband 53 will be understood to be without adverse effect in the operation of the present system, however, since the output 49 of final modulated amplifier 44 is delivered, as indicated, to a bandpass filter 55 of appropriate design to attenuate said upper sideband 53 and establish the required power relation between the aural carrier and video subcarrier outputs, thus producing at the output 56 of bandpass filter 55 a composite television high frequency signal 57, having the desired frequency modulated aural carrier 58, at frequency $f_c \pm f_m$, and the desired amplitude modulated video sideband 59, including as a component thereof a video high frequency subcarrier 60 at frequency $f_c$—4.5 mc. Said composite television high frequency signal 57 may thereupon be delivered to a suitable antenna 61 either directly or through one or more linear amplifier stages 62, as desired, depending upon the allocated output power level of the system.

By virtue of the single carrier television transmission system presented, one component of the radiated energy is the frequency modulated aural carrier which may provide a noise suppression standard not presently available from existing video transmission systems. One manner in which to utilize such constant amplitude standard in the radiated energy is a noise suppression circuit employing an energy pickup loop 65 to provide a sample of the radiated energy, such sample being in turn fed, as indicated at 66, through a selective filter 67, designed to select only the $f_c \pm f_m$ frequency band of the radiated energy, as indicated. The output of selective filter 67 is in turn delivered, as indicated at 68, to an AM detector 69, the output of which is introduced by known negative feedback circuitry to the input of video amplifier-modulator stage 42, as indicated at 70. By such noise suppression circuit, not only is amplitude modulated noise generated in the video amplifier-modulator, the final modulated amplifier, and the linear amplifier stages minimized with respect to the aural carrier, but such corrective signal is applied as well to the amplitude modulated video sideband.

It has been demonstrated how a composite television signal may be modulated on a single transmitted carrier in a manner consistent with existing transmission standards, rendering unnecessary separate carrier generators and separate output power amplifiers and enabling use of an amplitude modulated noise suppression circuit to minimize output stage noise in both the aural signal and video signal modulation. It has been further demonstrated, by novel video signal modulation procedures based on inversion of the video signal about a video subcarrier of frequency corresponding to the desired frequency difference between the output video carrier frequency and aural carrier center frequency, that transformer coupling between the various video stages may be used to advantage, that a simplified, low-level, lowpass vestigial filter may be employed, that the necessity for separate D. C. restoration circuits at the input of the final modulated amplifier is eliminated, that notch filtering is unnecessary, and that maintenance within prescribed tolerances of the aforesaid frequency difference between the output video carrier and aural carrier center frequency is rendered less critical through use of heterodyning techniques.

As only a typical embodiment of the present invention has been described, various modifications may be made within the scope thereof. Thus, as previously indicated, separate excitation sources other than an FM exciter 10 can be used for generation of the first reference frequency 15 and the second frequency modulated reference frequency 12, and the order thereof may be subject to considerable variation, it being essential only that a video waveform of the nature of waveform 37 result for delivery to the input of the final modulated amplifier 44. Also, it shall be correspondingly apparent that the function of vestigial filter 35 can be accomplished between video modulator 19 and video inverter-modulator 27, or at such other point prior to the final modulated stage as desired, depending on suitable design thereof to pass the desired frequencies at the particular point of vestigial suppression of the video signal.

It will be additionally apparent that the inversion of the video signal and the frequency modulation thereof by the aural signal, as contemplated by the present invention, can also be accomplished by modulating the FM wave 12 by the original video signal 16 and then inverting such signal at inverter-modulator stage 27 rather than by the inverse modulation procedure set forth in the typical embodiment specifically disclosed.

While the term "carrier" has been used to denote the R. F. input to the final modulated amplifier and to also denote a component of the radiated energy, it is to be understood that the invention does not require that the R. F. carrier input to the final modulated amplifier and the radiated carrier be of the same frequency level, since the modulated carrier output of the final modulator 44 or bandpass filter 55 may be readily increased in frequency level by known mixing and filtering techniques prior to radiation, consistent with the modulation procedure here presented.

It will also be apparent that the modulation procedures of the present invention are readily adaptable to low-level, medium-level or high-level modulation of the final modulated amplifier, depending upon the number of linear amplifier stages 62 employed. Correspondingly, final modulated amplifier 44 may be either plate-modulated or grid-modulated, depending upon the power level selected.

From the foregoing description of the invention, it will be seen that all of the components of the system are of themselves well known or readily discerned from known circuit design principles according to the considerations here set forth. Accordingly, the transmission system specifically disclosed, and various other modifications thereof, will be apparent to those skilled in the art and are within the scope of the present invention as defined by the appended claims.

What is claimed is:

1. A modulation system for modulating a carrier wave with dissimilar signals, comprising means generating a first signal for amplitude modulation of said carrier, means generating a second signal for frequency modulation of said carrier, means inverting said first signal, means vestigially suppressing such inverted first signal, means frequency modulating said inverted first signal with said second signal, means generating said carrier and frequency modulating the same with said second signal, final modulation means modulating said frequency modulated carrier by said frequency modulated inverted first signal in a manner causing substantial cancellation of the frequency modulation in the resulting difference sideband, and means selecting said frequency modulated carrier and said difference sideband.

2. A radiant energy modulation system comprising a carrier wave generation means, means frequency modulating said carrier wave with an aural signal, means producing a video signal, means generating a first reference frequency, means developing said video signal as sidebands about said first reference frequency, means generating a second reference frequency, means frequency modulating said second reference frequency with said aural signal, means heterodyning said video signal with said frequency modulated second reference frequency causing inversion and frequency modulation of the lower sideband video signal in the output from such means, means vestigially suppressing the resulting inverted signal, means modulating said frequency modulated carrier wave with said frequency modulated inverted video signal in a manner causing cancellation of the frequency modulation of the resulting lower sideband, and means selecting the resulting lower sideband and said aural frequency modulated carrier.

3. A radiant energy transmission system comprising carrier wave generation means, means frequency modulating said carrier wave with an aural signal, means producing a video signal, a video modulator developing said video signal as sidebands about a first reference frequency, means frequency modulating a second reference frequency with said aural signal, means heterodyning such video signal with said frequency modulated second reference frequency causing inversion and frequency modulation of the lower sideband video signal in the output from such means, means vestigially suppressing the resulting inverted signal, means modulating said frequency modulated carrier wave with said frequency modulated inverted video signal causing cancellation of the frequency modulation of the resulting lower sideband, and means selecting and passing the resulting lower sideband and said aural frequency modulated carrier to radiation means.

4. A system for multiplexing video and aural signals in a television transmitter comprising means generating a video signal, means generating a predetermined first frequency, means mixing said video signal with said predetermined first frequency, means generating an aural signal, means generating a predetermined second frequency lower than and having a constant frequency difference from said first frequency, means frequency modulating said predetermined second frequency with said aural signal, means heterodyning said video modulated first frequency and said frequency modulated second frequency, a lowpass filter vestigially suppressing frequencies above said frequency difference in the resulting heterodyned signal, means producing a frequency modulated carrier wave from said frequency modulated second frequency, means modulating said frequency modulated carrier wave by said lowpass filter output with the frequency modulation of each input in phase causing the frequency modulation of the components of the resulting difference video sideband to be substantially eliminated therefrom, filter means attenuating the summation video sideband resulting in the output of the latter modulation stage, linear amplifier means amplifying the resulting frequency modulated aural signal carrier and amplitude modulated video signal subcarrier, and means selecting the resulting composite television signal carrier wave for radiation.

5. A system for generating a transmitted television signal carrier having a frequency modulated aural signal and an amplitude modulated video signal about a video high frequency subcarrier related to said frequency modulated aural signal carrier center frequency by a constant frequency difference, comprising means generating a video signal, means generating a first low-order reference frequency, means mixing said video signal with said first low-order reference frequency to produce a video signal having upper and lower sidebands about said first reference frequency, means generating a second low-order reference frequency lower than and differing in frequency from said first reference frequency by the desired frequency difference between said output video high frequency subcarrier and the aural carrier center frequency, means frequency modulating said second reference frequency with said aural signal, means heterodyning the aforesaid first reference frequency and associated video sidebands with said aural signal frequency modulated second reference frequency, the difference frequencies from such heterodyning stage providing an inverted double sideband, amplitude modulated video signal about a video signal subcarrier of frequency corresponding to the aforesaid frequency difference between the aforesaid output video high frequency subcarrier and the aural carrier center frequency, such double sideband inverted video signal components also being frequency modulated by the aural signal, a lowpass filter vestigially suppressing such heterodyning stage output signal frequencies above said video signal subcarrier frequency, means generating an aural carrier, means frequency modulating said aural carrier with said aural signal, means modulating said frequency modulated aural carrier with the aforesaid video signal subcarrier and associated sideband frequencies in a manner so that the difference frequencies appearing in the last-mentioned modulation output have the aural signal frequency modulation substantially cancelled therefrom, bandpass filter means selecting from the last-mentioned modulation stage the aural carrier and said difference frequencies, the latter thereby constituting the required amplitude modulated video signal with respect to the video high frequency subcarrier, in turn related to said aural carrier center frequency by the aforesaid required frequency difference, and means selecting said aural carrier and said difference frequencies for radiation.

6. A radiant energy transmission system comprising a carrier wave generation means, means producing an aural signal, means frequency modulating said carrier wave with said aural signal, means producing a video signal, means generating a first reference frequency of the same order of magnitude as 13.5 megacycles, a video modulator developing said video signal as sidebands about said first reference frequency of the same order of magnitude as 13.5 megacycles, means generating a second reference frequency of the same order of magnitude as 9.0 megacycles, means modulating with said aural signal said second reference frequency of the same order of magnitude as 9.0 megacycles, means heterodyning such video signal with said frequency modulated second reference frequency to cause inversion and frequency modulation of the video signal output from such means, means modulating said frequency modulated carrier wave with said frequency modulated inverted video signal to cause cancellation of the frequency modulation of the resulting lower video sideband, and means selecting the resulting lower video sideband and said aural frequency modulated carrier.

7. A system for generating a transmitted television signal carrier having a frequency modulated aural signal and an amplitude modulated video signal about a high frequency subcarrier related to said frequency modulated aural carrier center frequency by a frequency difference of 4.5 megacycles, comprising means generating a video signal, means generating a first reference frequency constituting a low-order multiple of said frequency difference, means mixing said video signal with said first reference frequency to produce a video signal having double sidebands about said first reference frequency, means generating a second low-order reference frequency lower than and differing in frequency from said first reference frequency by said frequency difference, means frequency modulating said second reference frequency with said aural signal, means heterodyning the aforesaid first reference frequency and associated video signal sidebands with said aural signal frequency modulated second reference frequency in producing from such heterodyning stage an output comprising an inverted, double sideband amplitude modulated video signal about a 4.5 megacycles video subcarrier, the components of said double sideband inverted video signal also being frequency modulated by the aural signal, a lowpass filter vestigially suppressing such heterodyning stage output signal frequencies above said video subcarrier frequency, means generating an aural carrier, means frequency modulating said aural carrier with said aural signal, means modulating said frequency modulated aural carrier with the aforesaid video subcarrier and associated subcarrier sideband output from said lowpass filter in a manner so that the difference frequencies appearing in the last-mentioned carrier modulation output have the aural signal frequency modulation substantially cancelled therefrom, bandpass filter means selecting from the last-mentioned modulation stage the aural carrier and said difference frequencies, the latter thereby constituting the required amplitude modulated video signal with respect to said video high frequency subcarrier, in turn related to said aural carrier center frequency by the aforesaid required frequency difference, and means selecting said aural carrier and said difference frequencies for radiation.

8. In a composite television signal transmission system, means generating a video signal, means mixing said video signal with a predetermined first frequency, means generating an aural signal, means frequency modulating with said aural signal a predetermined second frequency lower than and having a constant frequency difference from said first frequency corresponding to the desired separation frequency between the output video subcarrier frequency and the output aural carrier center frequency, means heterodyning said video modulated first frequency and said frequency modulated second frequency causing inversion of the video signal in the resulting difference sideband, a lowpass filter vestigially suppressing frequencies above said frequency difference in the resulting signal, means generating a frequency modulated carrier wave from said frequency modulated second frequency, inductive coupling means for coupling the output of said lowpass filter to a Class B amplifier-modulator, said amplifier-modulator modulating said frequency modulated carrier wave by said lowpass filter output with the frequency modulation of each input of such phase in causing the frequency modulation components of the resulting difference video sideband to be substantially eliminated therefrom, means selecting said frequency modulated aural signal carrier and said difference video sideband for radiation, said amplifier and modulator inductive coupling means serving to suppress frequencies in the inverted video signal less than about 25 kilocycles, thereby eliminating the necessity for notch filtering means in the output of the transmission system.

9. In a composite television signal transmission system, means generating a video signal, means mixing said video signal with a predetermined first frequency, means generating an aural signal, means frequency modulating with said aural signal a predetermined second frequency lower than and having a constant frequency difference from said first frequency corresponding to the desired separation frequency between the output video subcarrier frequency and the output aural carrier center frequency, means heterodyning said video modulated first frequency and said frequency modulated second frequency in causing inversion of the video signal in the resulting difference sideband, a lowpass filter vestigially suppressing frequencies above said frequency difference in the resulting signal, means generating a frequency modulated carrier wave from said frequency modulated second frequency, inductive coupling means coupling the output of said lowpass filter to an amplifier-modulator, said amplifier-modulator modulating said frequency carrier wave with said lowpass filter output in a final modulated amplifier with the frequency modulation of each input of such phase to cause the frequency modulation components of the resulting difference video sideband to be substantially eliminated therefrom, means selecting said frequency modulated aural signal carrier and said difference video sideband, and means radiating the resulting composite television signal carrier wave, said final modulated amplifier inductive coupling input means being designed to pass substantially without attenuation frequencies in the inverted video signal ranging from about 25 kilocycles to about 5.25 megacycles, including the video signal subcarrier component at 4.5 megacycles$\pm$the aural signal frequency modulation corresponding to the 0 frequency or direct current level of the initial video signal, such video signal inversion and inductive coupling means thereby eliminating the necessity for separate direct current restoration circuitry at the input of said final modulated amplifier.

10. In a transmission system according to claim 9, inductive coupling means between said means for mixing said video signal with a predetermined first frequency, said means for heterodyning said video modulated first frequency, said lowpass filter, and a video amplifying stage, the output of the latter also being inductively coupled to the video signal input of said final modulated amplifier.

11. In a single carrier television transmission system radiating a frequency modulated aural signal carrier and an amplitude modulated video sideband comprising a video high frequency subcarrier related to said frequency modulated aural signal carrier center frequency by a constant frequency difference, comprising a video amplifier coupled to a final modulated amplifier for modulating said frequency modulated aural carrier with an inverted video signal, the output from said final modulated amplifier being delivered through a bandpass filter and at least one stage of linear amplification to radiation means, said television transmission system further comprising a noise suppression circuit including an energy pickup means sampling the output energy from said linear amplifier, a selective filter selecting only the frequency modulated aural carrier, an amplitude modulation detector detecting amplitude modulation of the sampled frequency modulated aural carrier energy, and a negative feedback circuit connecting the output of said amplitude modulation detector to the input of said video amplifier, said noise suppression circuit minimizing amplitude modulated noise generated in the final modulated amplifier and the linear amplifier stage with respect to said frequency modulated aural carrier frequencies and also with respect to the amplitude modulated video sideband frequencies.

12. A system for multiplexing video and aural signals in a television transmitter comprising means generating a video signal, means modulating a 13.5 megacycles wave with said video signal, means generating an aural signal, means frequency modulating a 9.0 megacycles wave with said aural signal, means heterodyning said video modulated 13.5 megacycles wave and said frequency modulated 9.0 megacycles wave, a lowpass filter suppressing frequencies above 5.25 megacycles in the output signal from such heterodyning means, means generating a frequency modulated aural carrier wave from said frequency modulated 9.0 megacycles wave, inductive coupling means passing said lowpass filter output to means modulating said frequency modulated aural carrier wave with said lowpass filter output, the frequency modulation of each signal being in phase to cause the frequency modulation of the components of the resulting difference video sideband to be eliminated therefrom, bandpass filter means suppressing the summation sideband resulting in the output of the latter modulation stage, linear amplifier means amplifying the resulting frequency modulated aural signal carrier and amplitude modulated difference video sideband, and means selecting such amplified composite television signal for radiation.

13. A transmission system according to claim 12, further comprising a noise suppression circuit including an energy pickup means sampling the output energy from said linear amplifier means, a selective filter selecting only the frequency modulated aural carrier, an AM detector detecting amplitude modulation of the sampled frequency modulated aural carrier energy, and a negative feedback circuit connecting the output of said amplitude modulation detector to the input of said video amplifier, said noise suppression circuit minimizing amplitude modulated noise generated in the final modulated amplifier and the linear amplifier stage with respect to said frequency modulated aural carrier frequencies and also with respect to the amplitude modulated video sideband frequencies in said composite television signal.

14. A modulation system for modulating a carrier wave with dissimilar signals, comprising means generating a carrier, means generating a first signal adaptable to amplitude modulation of said carrier, means generating a second signal adaptable to frequency modulation of said carrier, means inverting said first signal and frequency modulating said first signal with said second signal, means frequency modulating said carrier with said second signal, final modulation means modulating said frequency modulated carrier with said frequency modulated inverted first signal in a manner causing substantial cancellation of the frequency modulation in the resulting difference sideband, and means selecting said frequency modulated carrier and said difference sideband.

15. A system for developing a television signal modulated wave, comprising means generating an aural signal, means generating a carrier frequency modulated with said aural signal, means generating a subcarrier amplitude modulated by a vestigially suppressed video signal in turn frequency modulated with said aural signal, means amplitude modulating said carrier with said modulated subcarrier in a manner substantially cancelling the frequency modulation on the resulting video signal lower sideband, and means selecting said aural signal modulator carrier and said resulting lower sideband for radiation.

16. A system for modulating a television signal carrier, comprising means generating a video signal, means generating an aural signal, means generating a subcarrier amplitude modulated by said video signal, means frequency modulating said video signal modulated subcarrier with said aural signal, means inverting said video signal modulated subcarrier, means vestigially suppressing said inverted video signal, means frequency modulating said carrier with said aural signal, means amplitude modulating said frequency modulated aural carrier with said frequency modulated, video signal modulated subcarrier in a manner substantially cancelling the frequency modulation from the amplitude modulated component of said video signal in the resulting difference sideband, and means selecting the aural carrier and said difference sideband from the output of such latter modulation stage.

17. A system for modulating plural signals on a carrier wave, comprising means generating a first signal, means generating a second signal, means inverting said first signal, means frequency modulating said first signal with said second signal, means frequency modulating said carrier with said second signal, means modulating said frequency modulated carrier with said frequency modulated inverted first signal in a manner substantially cancelling the frequency modulation from the resulting difference sideband output, and means selecting said frequency modulated first signal carrier and said difference sideband from said output.

18. A system for modulating a television signal carrier, comprising means generating an amplitude modulated video signal means inverting said amplitude modulated video signal, means generating an aural signal, means frequency modulating said inverted video signal with said aural signal, means generating said carrier, means frequency modulating said carrier with said aural signal, means modulating the frequency modulated aural carrier with said frequency modulated inverted video signal in a manner substantially cancelling the frequency modulation from the amplitude modulated components of said video signal in the resulting difference sideband, and means selecting the aural carrier and said difference sideband from the output of such latter modulation stage.

19. A system for generating a television signal modulated carrier, comprising means generating an amplitude modulated video signal, means inverting said video signal about a video subcarrier corresponding in frequency to the desired frequency difference between the output video output carrier frequency and the aural carrier center frequency, means generating an aural signal means frequency modulating said first mentioned video signal with said aural signal, means vestigially suppressing such inverted video signal frequencies above said video subcarrier frequency, means generating an aural carrier frequency modulated with said aural signal, means modulating said frequency modulated aural carrier with said aural frequency modulated inverted video signal in a manner substantially cancelling the aural frequency modulation from said video signal in the resulting difference sideband, and means selecting for radiation the aural carrier and said difference sideband from the output of such latter modulation stage.

20. A system for developing a television signal modulated carrier having amplitude modulated thereon a video signal and frequency modulated thereon an aural signal, comprising means generating a video signal, means mixing said video signal with a first reference frequency to produce a video signal having double first-order sidebands about said first reference frequency, means for generating a second reference frequency, means for generating a second reference frequency lower than and differing in frequency from said first reference frequency by the desired frequency difference between the output video carrier frequency and the aural carrier center frequency, means frequency modulating said second frequency with said aural signal, means heterodyning the aforesaid first reference frequency and associated first-order video signal sidebands with said aural frequency modulated second reference frequency, the output from such heterodyning stage including difference frequencies providing an inverted amplitude modulated video signal about a video subcarrier of frequency corresponding to the aforesaid frequency difference between the output video carrier frequency and the aural carrier center frequency, such inverted video signal being also frequency modulated by the aural signal, means vestigially suppressing such heterodyning stage output signal frequencies above said video subcarrier frequency, means generating an aural carrier, means frequency modulating said aural carrier with said aural signal, means modulating said frequency modulated aural carrier with the aforesaid video subcarrier and associated vestigially suppressed video sideband frequencies in a manner so that the difference frequencies appearing in the last-mentioned modulation stage output have the aural frequency modulation substantially cancelled therefrom, means selecting from the last-mentioned modulation stage the aural carrier and the first-order difference and summation frequencies, and means selecting said aural carrier and said difference frequencies for radiation.

References Cited in the file of this patent

UNITED STATES PATENTS 2,578,714 Martin ---------------- Dec. 18, 1951